United States Patent [19]

Beck et al.

[11] Patent Number: 4,491,949
[45] Date of Patent: Jan. 1, 1985

[54] APPARATUS FOR PRODUCING LASER RADIATION

[75] Inventors: Rasmus Beck, Neu-Isenburg; Erich Hansen, Bad Soden, both of Fed. Rep. of Germany

[73] Assignee: Battelle-Institut e.V., Frankfurt, Fed. Rep. of Germany

[21] Appl. No.: 377,561

[22] Filed: May 12, 1982

[30] Foreign Application Priority Data

May 13, 1981 [DE] Fed. Rep. of Germany ....... 3118868

[51] Int. Cl.³ .......................... H01S 3/02; H01S 3/097
[52] U.S. Cl. ........................................ 372/86; 372/83; 372/87
[58] Field of Search ..................... 372/86, 87, 83, 34

[56] References Cited

FOREIGN PATENT DOCUMENTS 2910177  4/1981  Fed. Rep. of Germany .
 150974  9/1981  German Democratic Rep. .
1443127  7/1976  United Kingdom .

OTHER PUBLICATIONS

*Electronics Letters*, Improved Excitation Techniques for Atmospheric Pressure $CO_2$ Lasers", Mar. 25, 1971, vol. 7, Nos. 5/6.
*J. App. Phys.*, "Laser Gain Characterization of Near-Atmospheric $CO_2$: $N_2$: He Glows in a Planar Electrode Geometry", Sep. 1973, vol. 44, No. 9.
*Optics Communications*, "Construction and Performance Characteristics of a Rapid Discharge TEA $CO_2$ Laser", Oct. 1978, vol. 27, No. 1.

*Primary Examiner*—James W. Davie
*Attorney, Agent, or Firm*—Fisher, Christen & Sabol

[57] ABSTRACT

Apparatus for producing laser radiation which includes a pair of discharge electrodes for firing a gas discharge which extends transversely with respect to the axis of the laser resonator, wherein pre-ionization is produced by a corona discharge, a charging-and-discharging circuit and a gas circulating-and-cooling system. The first electrode is secured to the wall of the gas chamber which is made from non-conducting material, wherein the securing elements serve as current supply means. The second electrode is mounted to the same wall as the first electrode on a plurality of metal rods. Such metal rods simultaneously provide the mechanical support function and the electrical current supply, and, at least in the region of the gas chamber, are surrounded by an insulator tube having a high dielectric constant so that a corona discharge can be produced between the first electrode and the insulated metal rods.

14 Claims, 10 Drawing Figures

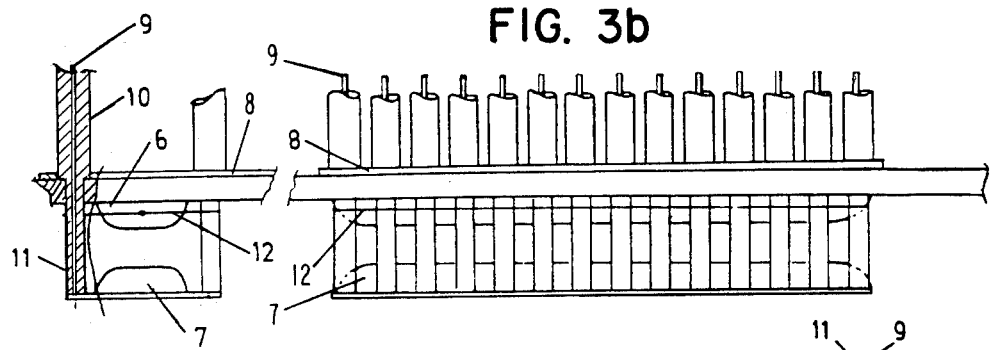
FIG. 3a
FIG. 3b
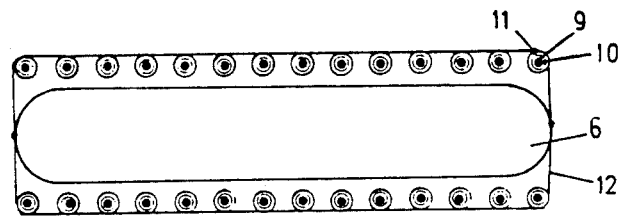
FIG. 3c
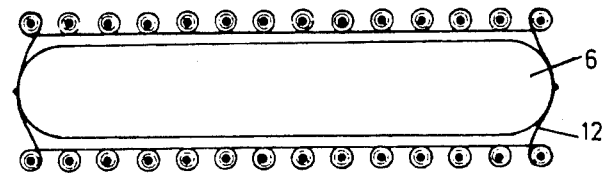
FIG. 3d
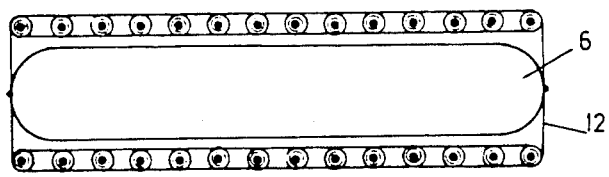
FIG. 3e

APPARATUS FOR PRODUCING LASER RADIATION

BACKGROUND OF THE INVENTION

1. Field Of The Invention

The invention relates to an apparatus for producing laser radiation.

2. Prior Art

Laser arrangements, wherein the laser mix in the resonator is excited transversely with respect to the optical axis at atmospheric pressure, are known as TEA-lasers (Transversely Excited Atmospheric pressure lasers) and are nowadays the most important developments in the laser art. Examples of that type of laser are the $CO_2$TEA-lasers in the infra-red spectral range and, for the visible and near ultra-violet spectral range, respectively, the $N_2$-lasers and Excimer-lasers. A common factor in all these lasers is a relatively simple mode of operation and a high degree of efficiency. TEA-lasers having a high pulse frequency are of great interest in regard to technical-scientific uses, for example, in laser chemistry, material processing and lidar experiments. On the one hand, they have a high level of mean output which is comparable to the longitudinally excited continuous $CO_2$-laser and, on the other hand, they have a high pulse peak output.

In the TEA-laser, the laser gas mixture is excited by a homogeneous electrical discharge at from about 30 to 50 kV voltage between two oppositely disposed electrodes which are elongate in the direction of the optical axis. In this arrangement, it is important for the discharge to occur uniformly between the electrode surfaces and not to contract to a spark as the laser gas is then partially overheated and moreover not excited at all. Necessary conditions to provide for uniform discharge at atmospheric pressure are the use of electrode pairs with a Rogowski or Chang profile, a lowinductance construction in respect to the discharge circuit, comprising high-tension capacitors, high-tension switches and supply leads to the laser electrodes, and pre-ionization of the laser gas.

Pre-ionization firstly produces free charge carriers which are distributed homogeneously over the discharge space. The main discharge which then begins shortly thereafter can then spread quickly and uniformly over the entire volume between the electrodes. The first TEA-laser by R. Dumanchin and the later Lamberton-Pearson laser and almost all TEA-lasers which are in use today have the common feature that ultra-violet radiation or electron beams are used for producing the pre-ionization [for example, *Appl. Phys. Letters*, 19, 506, (1971)]. In that case, the UV-radiation is produced by a preliminary discharge by a trigger wire to the anode by means of auxiliary capacitors. The introduction of an auxiliary gas comprising tri-n-propylamine which is mixed with the laser gas increased the effectiveness of this arrangement by virtue of its low ionization potential. Other UV-pre-ionization systems comprise spark trains which are arranged on a carrier in series or over entire surfaces, either beside the electrodes or directly in an electrode. A disadvantage with all these spark train systems is that they are subject to wear and generally have to be changed after a few thousand discharges. In addition, the pre-ionization systems require additional capacitors, resistors and pre-trigger means such as time delay circuits, a second high-tension switch, etc. In addition, most of the pre-ionization systems impede the uniform flow of laser gas between the laser electrodes. This is a difficulty in particular in TEA-lasers having a rapid pulse sequence and gas circulation.

However, it is possible to omit an additional pre-ionization means if the side walls of the laser at the same time form the voltage supply means to an electrode. Disposed between the electrically conducting side walls and the second electrode is an insulation and thereon, on each side, is a glass plate [H. Jetter and K. Gürs, Optical Eng. 15, (1976), 17-19; G. J. Ernst and A. G. Boer, Optics Comm. 27, (1978), 105]. Due to the rapid rise in voltage at the beginning of the main discharge, a high field strength is very quickly produced between the upper electrode and the side walls. That produces a corona discharge for a period of from 10 to 30 nsec on the side walls which are covered with insulating material. When the corona discharge occurs, an UV-light pulse is produced, which provides the pre-ionization for the main discharge. The effectiveness of pre-ionization and thus the quality of the main discharge substantially depends in that arrangement on the geometry of the arrangement and the discharge voltage.

However, the last-mentioned arrangement is not suitable for TEA-lasers with a rapid pulse sequence as the laser gas which flows transversely with respect to the optical axis must be as far as possible exchanged twice, over the discharge volume, between two laser pulses, and therefore there is no possibility of using strip conductors, plates, walls, etc., which connect the two electrodes.

BROAD DESCRIPTION OF THE INVENTION

An object of the invention is to provide a TEA-laser having a rapid pulse sequence, which has a simple and wear-free construction that does not impede the gas flow transversely with respect to the optical axis, and which does not have the above-described disadvantages of known arrangements. Other objects and advantages of the invention are set out herein or are obvious herefrom to one ordinarily skilled in the art.

The objects and advantages of the invention are achieved by the apparatus of the invention.

The invention involves an apparatus for producing laser radiation. The apparatus includes a pair of discharge electrodes for firing a gas discharge which extends transversely with respect to the axis of the laser resonator, wherein pre-ionization is produced by a corona discharge, a charging-and-discharging circuit, and a gas circulating-and-cooling system. The invention apparatus solves the prior art problems and achieves the invention objects as follows. The first electrode is secured to the wall of the gas chamber which is composed of a non-conducting material. The securing elements serve as current supply means. The second electrode is mounted to the same wall on a plurality of metal rods. The metal rods simultaneously provide the mechanical support function and the electrical current supply and, at least in the region of the gas chamber, are surrounded by an insulator tube having a high dielectric constant so that a corona discharge can be (is) produced between the first electrode and the insulated metal rods.

Concerning the apparatus of the invention, preferably at least one conductor, which is connected to the first electrode, is provided for boosting the corona discharge. Preferably such conductor comprises a wire which is stretched parallel to the electrodes transversely over the insulator tubes and is connected to the first electrode at one or a plurality of positions. Also, preferably an insulated conductor, which is connected to the first electrode, is disposed parallel to each insulator tube. The insulator tubes preferably are comprised of glass, and a polytetrafluoroethylene layer preferably is provided between each metal rod and each insulator tube. Preferably a plurality of electronic ventilators and a gas cooler are arranged in the gas chamber below the second electrode and are insulated with respect to the second electrode, and preferably there are two curved gas guide shell members. The laser resonator preferably is formed by two reflectors, which are adjustably held in end plates, and by spacer rods, which are insulated from the electrical discharge circuit. Preferably a high-tension chamber is provided adjoining the gas casing, with power storage capacitors, with its high-tension switch being disposed in such chamber, and with the insulated metal rods projecting into such chamber and being secured to a plate. Further, preferably the metal rods are only insulated by a polytetrafluoroethylene tube in the high-tension chamber.

The laser arrangement according to the invention provides a high level of output power with an excellent quality of optical radiation and rapid pulse sequence, is cheap to produce, is a simple construction, and is wear-free. Due to the arrangement of the gas circulating system and the capacitor set, these units are easily accessible. The means for producing the corona discharge does not obstruct the flow of laser gas. The speed of gas circulation can be easily rated in such a way as to produce a double exchange in the volume of gas between the discharge electrodes, between two pulses.

BRIEF DESCRIPTION OF THE DRAWINGS

The invention is described below in greater detail with reference to the accompanying drawings which only show an embodiment of the invention in diagrammatically simplified form. In the drawings:

FIG. 3a is an end view of a mode of mounting a conductor between an electrode and the insulated metal rods for the purpose of boosting the corona discharge;

FIG. 3b is a side view of the mode of FIG. 3a;

FIG. 3c is a top view of another mode of mounting the conductor;

FIG. 3d is a top view of a further mode of mounting the conductor;

FIG. 3e is a top view of a still further mode of mounting the conductor;

FIG. 4b is a side view of the mode of FIG. 4a; and

FIG. 4c is a top view of the mode of FIG. 4a.

DETAILED DESCRIPTION OF THE INVENTION

Figure 1:
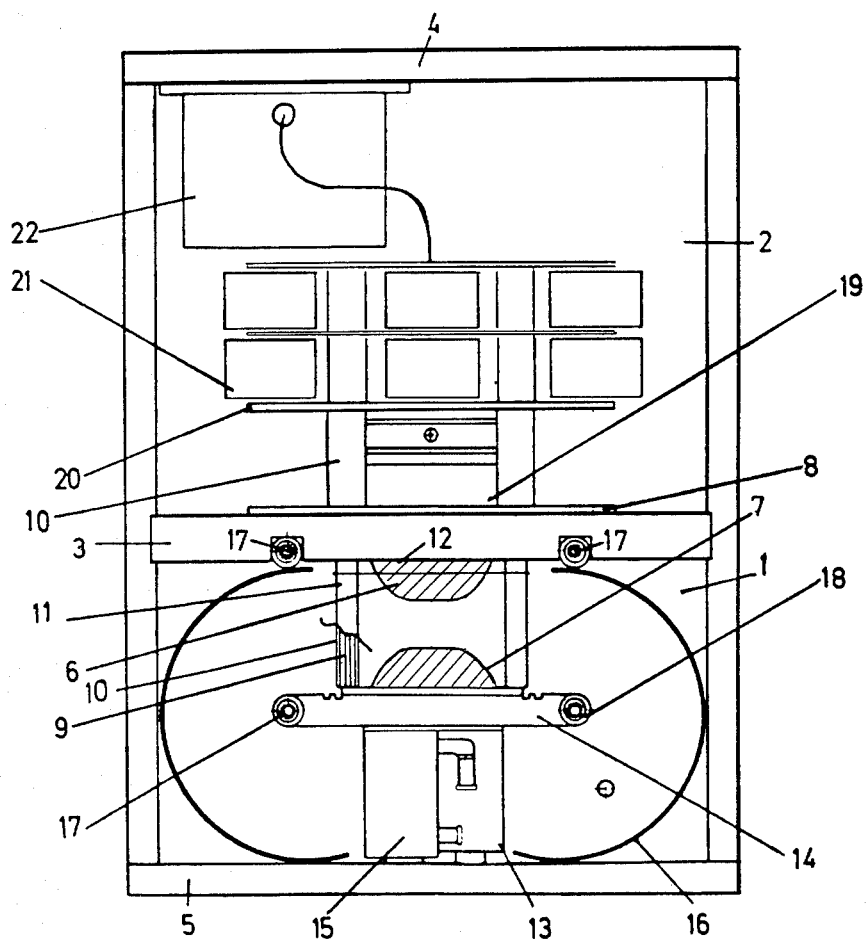
FIG. 1 is a view in section transverse to the optical axis of the apparatus according to the invention.

The apparatus, according to the embodiment of the invention shown in FIG. 1, is composed of gas chamber 1 and adjoining high-tension chamber 2, which are made from a nonconducting material and separated from each other by intermediate plate 3, preferably composed of plexiglas. Both high-tension chamber 2 and gas chamber 1 are provided with removable cover members 4 and 5 in order to permit easy access to the individual components.

Disposed in gas chamber 1 are two discharge electrodes 6 and 7, which have a cross-sectional configuration which is in accordance with a Rogowski or Chang profile and which are elongate in the direction of the optical axis. Upper electrode 6 is carried on intermediate plate 3 and screwed to electrode plate 8 in high-tension chamber 2 by way of securing screws (not shown), which at the same time serve as voltage supply means. Lower electrode 7 is also mounted to intermediate plate 3, more specifically by means of a number of metal rods 9 arranged on both sides of the discharge path. Metal rods 9 are surrounded by tubes 10 composed of polytetrafluoroethylene or plexiglas, for the purposes of insulation with respect to second electrode 7. Further, casing tube 11 composed of a material having a high dielectric constant, for example glass, is disposed on insulation 10 in gas chamber 1. Pre-ionization of the gas mixture is effected by the corona discharge which is produced by the steep rise in field strength before the actual voltage pulse between electrode 6 and metal bars 9.

The corona discharge which occurs in this arrangement is boosted by the provision in accordance with the invention of an electrical conductor, for example, thin copper wire 12, which is laid around glass casing tubes 11 and connected to one electrode 6, for example, the anode. Pre-ionization can be adjusted for a given electrode spacing by varying the wire-cathode distance.

Uniform gas circulation over the entire electrode length is effected by means of electronic ventilators 13 (80 mm × 80 mm), insulated by for example plexiglas plate 14, under electrode 7 (cathode). Gas cooler 15, which has water flowing through it, is disposed just behind ventilators 13 for the purposes of cooling the laser gas. The cooled laser gas is passed by way of gas guide shell members 16 through the excitation space in a closed circuit.

In comparison with other gas circulating systems, this construction has the advantage that, although it is directly disposed in gas chamber 1, nonetheless it can be easily dismantled simply by removing bottom plate 5 which is sealed by a round cord ring.

The gas circulating system makes it possible to produce a very uniform flow of gas at a speed of 3 m/sec. between electrodes 6 and 7. The gas flow speed only varies by 2 percent along the optical axis, which shows that the gas flows with a substantially laminar flow around casing tubes 11 (which only represent a low level of flow resistance).

The laser reflectors (which cannot be shown in FIG. 1) are held together by means of four spacer rods 17 (preferably composed of a material with a low degree of thermal expansion, for example Invar) mounted between intermediate plate 3 and insulating plate 14. Spacer rods 17 are also surrounded by insulator tubes 18, which are composed of, for example, plexiglas.

Disposed on electrode plate 8 in high-tension chamber 2 is spark gap 19 for the discharge circuit, and, thereabove, on second electrode plate 20 is located a set of low-inductance high-tension storage capacitors 21. The set of capacitors 21 can be rapidly changed, depending on the respective pulse energy required, as set 21 is easily accessible by virtue of removable cover member 4. High-tension chamber 2 still provides sufficient space for trigger transformer 22, series resistors and other high-tension components.

Metal bars 9, which are surrounded by polytetrafluoroethylene tubes 10, project into chamber 2 and are for example screwed into electrode plate 20 by means of a screwthread.

Figure 2:
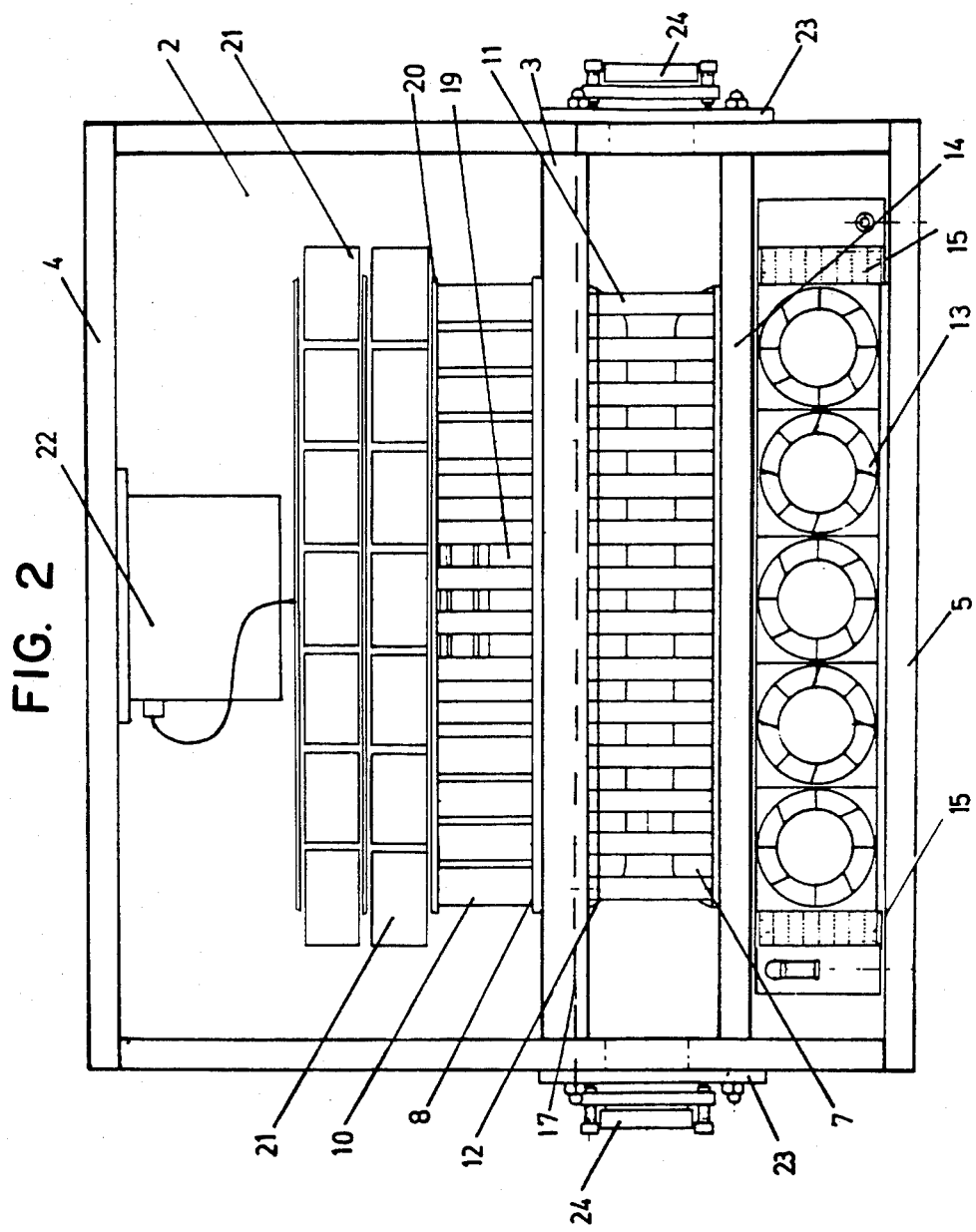
FIG. 2 is a view of the embodiment of FIG. 1 in section parallel to the optical axis.

The side view shown in FIG. 2 clearly illustrates in particular the configuration of the laser resonator and the arrangement of metal bars 9 which are surrounded by glass casing tubes 11.

End plates 23, which are composed of high-grade steel and upon which laser reflectors 24 are adjustably disposed, are screwed into a condition of abutment at the ends by way of spacer rods 17 which are shown in FIG. 1, and are sealed by O-rings with respect to the casing which are composed of for example plexiglas.

This frame construction composed of high-grade steel in the plexiglas casing ensures a high level of mechanical and thermal stability. When particularly high requirements are made in respect to the thermal stability of the resonator, resonator rods 17 may be made from Invar, quartz or glass ceramic (Zerodur).

FIGS. 3a and 3e show an arrangement for boosting the corona discharge. This construction is also shown in FIGS. 1 and 2. Referring to FIGS. 3a and 3b, wire 12 is passed around insulated metal bars 9 which are arranged along electrodes 6 and 7 in such a way as to make punctiform contact with electrode 6 at two points. FIGS. 3c to 3e show further ways of disposing (mounting) wire 12.

In the gas chamber, metal rods 9 are surrounded by polytetrafluoroethylene tube 10 and thereon by glass casing tube 11.

Figure 4B:
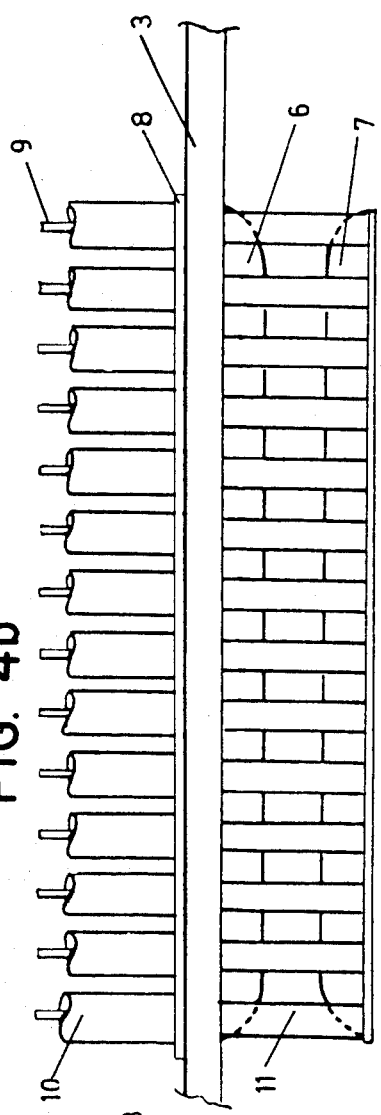
Figure 4C:
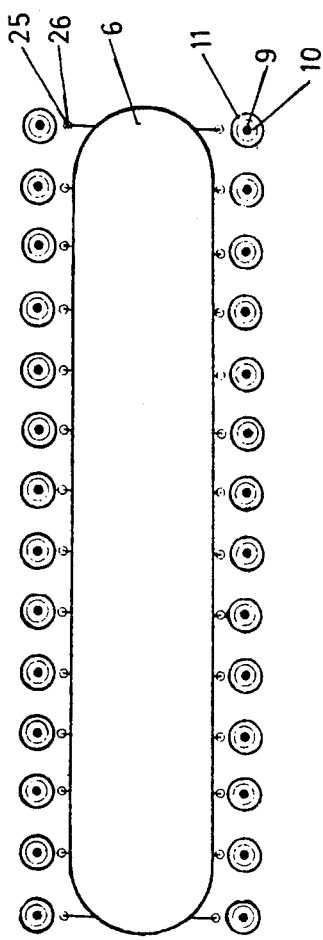
Figure 4A:
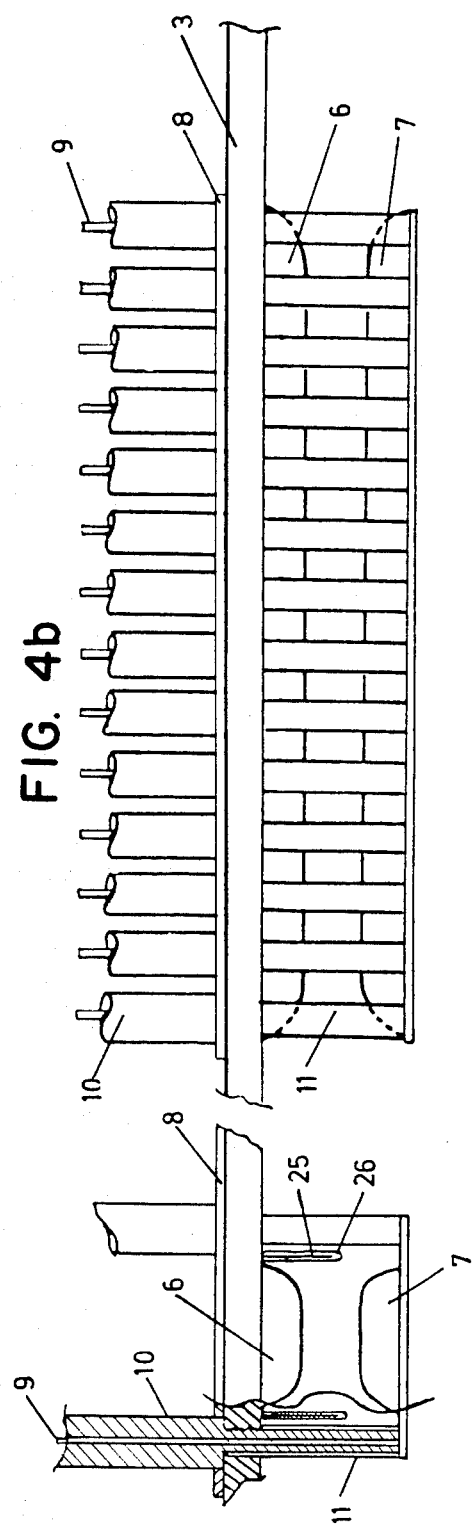
FIG. 4a is an end view of another way of mounting the conductor.

The arrangement shown in FIGS. 4a and 4c also produces boosting of the corona discharge with a uniform flow of gas in the laser excitation space. In this arrangement, short wires 25 are fused into glass or plastics material 26, arranged parallel to each glass casing tube 11 and electrically connected to one electrode 6 and 7 (for example, the anode).

By way of summary, the invention apparatus for producing laser radiation includes a pair of discharge electrodes (6, 7) for firing a gas discharge which extends transversely with respect to the axis of the laser resonator, wherein pre-ionization is produced by a corona discharge, a charging-and-discharging circuit and a gas circulating-and-cooling system. First electrode (6) is secured to the wall of gas chamber (1) which is made from non-conducting material. The securing elements serve as current supply means. Second electrode (7) is mounted to the same wall as first electrode (6) on a plurality of metal rods (9). Metal rods (9) simultaneously perform a mechanical support function and an electrical current supply function and, at least in the region of gas chamber (1), are surrounded by insulator tube (11) having a high dielectric constant so that a corona discharge can be produced between first electrode (6) and insulated metal rods (9).

What is claimed is:

1. In an apparatus for producing laser radiation having an optical axis extending between two mirrors and an ionizable gas enclosed within a gas chamber between said two mirrors, the improvement comprising: a pair of discharge electrodes for firing a gas discharge which discharge extends transversely with respect to said optical axis so as to produce pre-ionization of said ionizable gas by a corona discharge; a charging-and-discharging circuit; and a gas circulating-and-cooling system means for circulating said ionizable gas; a first electrode being secured to an intermediate support plate of said gas chamber by a plurality of securing elements; said gas chamber being composed of electrically insulating material; said securing elements serving as electrical current supply means; a second electrode being mounted on said intermediate support plate and being spaced a predetermined distance from said first electrode by a plurality of metal rods which simultaneously provide mechanical support and supply electrical current; each metal rod being surrounded by an electrical insulator having a high dielectric constant so that a corona discharge is produced between said first electrode and the insulated metal rods.

2. In an apparatus as claimed in claim 1, further comprising at least one conductor which is connected to said first electrode, provided for boosting the corona discharge.

3. In an apparatus as claimed in claim 2, wherein said conductor comprises a wire which is stretched parallel to said electrodes transversely over the electrical insulators and is connected to said first electrode at one or more positions.

4. In an apparatus as claimed in claim 2, further comprising at least one insulated conductor connected to said first electrode and which is disposed parallel to each of said insulated metal rods.

5. In an apparatus as claimed in claim 4 wherein said electrical insulators surrounding said metal rods are comprised of an outer tube of glass, and an intermediate polytetrafluoro-ethylene layer being between each said metal rod and each said electrical insulator.

6. In an apparatus as claimed in claim 5, further comprising a plurality of electronic ventilators and a gas cooler arranged in said gas chamber below said second electrode, said electronic ventilator and said gas cooler being insulated with respect to said second electrode, and further including two curved gas guide shell members.

7. In an apparatus as claimed in claim 6 wherein a laser resonator is formed by two reflectors which are adjustably held in end plates and by spacer rods which are insulated from said charging-and-discharging circuit.

8. In an apparatus as claimed in claim 7, further comprising a high-tension chamber adjoining said intermediate support plate; power storage capacitors and a high-tension switch being disposed in said chamber, said insulated metal rods projecting into said high-tension chamber and being secured to a plate.

9. In an apparatus as claimed in claim 8, wherein said metal rods are only insulated by a polytetrafluoroethylene tube in said high-tension chamber.

10. In an apparatus as claimed in claim 1, wherein said electrical insulator surrounding each said metal rod is comprised of an outer tube of glass, and an intermediate polytetrafluoroethylene layer being between each said metal rod and each said electrical insulator.

11. In an apparatus as claimed in claim 1, wherein a plurality of electronic ventilators and a gas cooler are arranged in said gas chamber below said second electrode and are insulated with respect to said second electrode, and wherein there are two curved gas guide shell members.

12. In an apparatus as claimed in claim 1, wherein a laser resonator is formed by two reflectors which are adjustably held in end plates and by spacer rods which are insulated from said electrical charging-and-discharging circuit.

13. In an apparatus as claimed in claim 1, wherein a high-tension chamber is provided adjoining said intermediate support plate, with power storage capacitors and a high-tension switch being disposed in said high-tension chamber; said insulated metal rods projecting into said chamber and being secured to a plate.

14. In an apparatus as claimed in claim 13, wherein said metal rods are only insulated by a polytetrafluoroethylene tube in said high-tension chamber.

* * * * *